US010926875B2

(12) United States Patent
Klein

(10) Patent No.: US 10,926,875 B2
(45) Date of Patent: Feb. 23, 2021

(54) DEVICES AND METHODS FOR FACILITATING CAPTURE OF UNMANNED AERIAL VEHICLES

(71) Applicant: Sanmina Corporation, San Jose, CA (US)

(72) Inventor: Max Edward Klein, Huntsville, AL (US)

(73) Assignee: SANMINA CORPORATION, San Jose, CA (US)

( * ) Notice: Subject to any disclaimer, the term of this patent is extended or adjusted under 35 U.S.C. 154(b) by 221 days.

(21) Appl. No.: 15/841,223

(22) Filed: Dec. 13, 2017

(65) Prior Publication Data
US 2018/0162530 A1 Jun. 14, 2018

Related U.S. Application Data

(60) Provisional application No. 62/434,324, filed on Dec. 14, 2016.

(51) Int. Cl.
*B64C 39/02* (2006.01)
*F41B 11/80* (2013.01)
(Continued)

(52) U.S. Cl.
CPC .............. *B64C 39/024* (2013.01); *B64D 1/02* (2013.01); *F41B 11/80* (2013.01); *F41H 11/02* (2013.01);
(Continued)

(58) Field of Classification Search
CPC . B64C 39/024; B64C 2201/141; B64C 39/02; B64C 29/0025; B64C 2201/108;
(Continued)

(56) References Cited

U.S. PATENT DOCUMENTS 2,722,075 A * 11/1955 Abrassart .............. A01M 31/00
43/1
3,972,386 A * 8/1976 Hayslip .................... A62B 1/18
182/50
(Continued)

FOREIGN PATENT DOCUMENTS

RU 72754 U1 4/2008
RU 2566226 C2 10/2015

OTHER PUBLICATIONS

PCT/US2017/066544. International Search Report & Written Opinion (dated May 31, 2018).

*Primary Examiner* — Medhat Badawi
(74) *Attorney, Agent, or Firm* — Loza & Loza LLP; Tyler Barrett

(57) ABSTRACT

Unmanned aerial vehicle (UAV) capture devices and methods of operation are disclosed. A UAV capture device may include a netting system including a net launch device and a net, a propulsion system including a plurality of propellers coupled to one or more motors, a positioning system, a camera system, and a processing system coupled to the netting system, the propulsion system, the positioning system, and the camera system. The processing system may include logic to operate the propulsion system to autonomously navigate to a general location of a target UAV, to operate the propulsion system to pursue the target UAV, to deploy the netting system to propel the net at the target UAV, and to confirm if the target UAV is captured in the net. Other aspects, embodiments, and features are also included.

5 Claims, 6 Drawing Sheets

(51) Int. Cl.
*F41H 11/02* (2006.01)
*F41H 13/00* (2006.01)
*G05D 1/00* (2006.01)
*F41H 11/04* (2006.01)
*G05D 1/12* (2006.01)
*B64D 1/02* (2006.01)
*B64D 3/00* (2006.01)

(52) U.S. Cl.
CPC ......... *F41H 11/04* (2013.01); *F41H 13/0006* (2013.01); *G05D 1/0094* (2013.01); *G05D 1/12* (2013.01); *B64C 2201/027* (2013.01); *B64C 2201/108* (2013.01); *B64C 2201/12* (2013.01); *B64C 2201/141* (2013.01); *B64C 2201/146* (2013.01); *B64C 2201/182* (2013.01); *B64D 3/00* (2013.01)

(58) Field of Classification Search
CPC ........ B64C 2201/042; B64C 2201/027; B64C 2201/123; B64C 2201/127; B64C 2201/146; B64D 3/00; B64D 35/06; F41B 11/80; F41H 11/02; F41H 13/0006; G05D 1/00942; G05D 1/00
See application file for complete search history.

(56) References Cited

U.S. PATENT DOCUMENTS

| | | | | |
|---|---|---|---|---|
| 6,394,016 B2* | 5/2002 | Swartout | ................. | B63B 21/56 114/254 |
| 6,626,398 B1* | 9/2003 | Cox | ..................... | B64C 39/024 244/45 R |
| 7,264,204 B1* | 9/2007 | Portmann | ............... | B63B 35/50 244/110 C |
| 7,328,644 B2* | 2/2008 | Vickroy | .................. | F41H 11/02 102/405 |
| 8,118,255 B1* | 2/2012 | Monson | ................... | B64F 1/02 244/110 F |
| 8,205,537 B1* | 6/2012 | Dupont | .............. | F41H 13/0006 102/504 |
| 8,375,837 B2* | 2/2013 | Goossen | ............ | F41H 13/0006 244/110 F |
| 9,085,362 B1* | 7/2015 | Kilian | ...................... | B64F 1/02 |
| 9,204,104 B1* | 12/2015 | Whelan | .................... | H04N 7/18 |
| 9,359,075 B1* | 6/2016 | von Flotow | ............ | B64D 5/00 |
| 9,589,448 B1* | 3/2017 | Schneider | ............ | G08B 25/016 |
| 9,643,722 B1* | 5/2017 | Myslinski | ............ | B64C 39/024 |
| 9,656,765 B2* | 5/2017 | von Flotow | ............. | B64F 1/02 |
| 9,739,881 B1* | 8/2017 | Pavek | ..................... | G01S 13/86 |
| 9,894,158 B2* | 2/2018 | Ranasinghe | .......... | H04W 76/25 |
| 2007/0261542 A1* | 11/2007 | Chang | .................... | F41H 11/02 89/1.11 |
| 2009/0076665 A1* | 3/2009 | Hoisington | .......... | G05D 1/0044 701/2 |
| 2010/0237183 A1* | 9/2010 | Wilson | .................. | B64C 39/024 244/3 |
| 2010/0243799 A1* | 9/2010 | Al-Qaffas | ................. | F41F 1/06 244/110 C |
| 2010/0250022 A1* | 9/2010 | Hines | ..................... | G05D 1/101 701/2 |
| 2012/0011996 A1* | 1/2012 | Glasson | .................. | F41H 11/04 89/36.17 |
| 2012/0153074 A1* | 6/2012 | Nannoni | ................. | B64C 27/57 244/17.13 |
| 2012/0187243 A1* | 7/2012 | Goldie | .................. | B64C 39/024 244/110 C |
| 2012/0210904 A1* | 8/2012 | Merems | .................. | F41H 11/02 102/504 |
| 2014/0216290 A1* | 8/2014 | Yee | .......................... | F41H 11/02 102/374 |
| 2014/0331984 A1* | 11/2014 | Brahler, II | ............ | F41B 11/723 124/76 |
| 2015/0360797 A1* | 12/2015 | Melish | .................... | B64F 1/025 244/110 C |
| 2016/0194069 A1* | 7/2016 | Taylor | ................... | B64C 39/024 244/17.23 |
| 2016/0251088 A1* | 9/2016 | Melish | ...................... | B64F 1/02 244/110 C |
| 2016/0355261 A1* | 12/2016 | Chin | ....................... | B64D 5/00 |
| 2016/0362173 A1* | 12/2016 | Marion | ................. | B64C 39/024 |
| 2016/0363422 A1* | 12/2016 | Young | .................... | F41H 11/04 |
| 2016/0364989 A1* | 12/2016 | Speasl | .................. | G08G 5/0034 |
| 2016/0376029 A1* | 12/2016 | Sekiya | ................... | F41H 11/02 244/110 F |
| 2017/0036762 A1* | 2/2017 | Gamble | ................ | B64C 27/08 |
| 2017/0069214 A1* | 3/2017 | Dupray | ................ | G08G 5/0021 |
| 2017/0096222 A1* | 4/2017 | Spinelli | ................ | B64C 39/024 |
| 2017/0144756 A1* | 5/2017 | Rastgaar Aagaah | ........................ B64C 39/024 |
| 2017/0154536 A1* | 6/2017 | Kreiner | ................ | G08G 5/0043 |
| 2017/0158340 A1* | 6/2017 | von Flotow | .......... | B64D 27/24 |
| 2017/0203840 A1* | 7/2017 | Myslinski | ............ | B64C 39/024 |
| 2017/0203841 A1* | 7/2017 | Myslinski | ............ | B64C 39/024 |
| 2017/0225784 A1* | 8/2017 | Hayes | ...................... | B64D 5/00 |
| 2017/0248969 A1* | 8/2017 | Ham | ........................ | B64C 39/024 |
| 2017/0253348 A1* | 9/2017 | Ashdown | ................ | B64F 1/02 |
| 2017/0261292 A1* | 9/2017 | Armstrong | ............. | F42B 12/56 |
| 2017/0289480 A1* | 10/2017 | Ochiai | ..................... | G06T 7/74 |
| 2017/0293301 A1* | 10/2017 | Myslinski | ............ | G05D 1/0088 |
| 2017/0351254 A1* | 12/2017 | Listwin | ................ | G05D 1/0022 |
| 2018/0027772 A1* | 2/2018 | Gordon | ................. | A01K 15/023 |
| 2018/0035606 A1* | 2/2018 | Burdoucci | ........... | A01D 34/008 |

* cited by examiner

DEVICES AND METHODS FOR FACILITATING CAPTURE OF UNMANNED AERIAL VEHICLES

PRIORITY CLAIM

The present Application for patent claims priority to Provisional Application No. 62/434,324 entitled "Devices and Methods for Facilitating Capture of Unmanned Aerial Vehicles" filed Dec. 14, 2016, and hereby expressly incorporated in its entirety by reference herein.

TECHNICAL FIELD

The technology discussed below relates generally to unmanned aerial vehicles (UAVs), and more specifically to methods and devices for facilitating the capture of unauthorized UAVs.

BACKGROUND

A recent area of concern is the increasing use of unmanned aerial vehicles (UAVs) by hostile adversaries. Common UAVs small enough to be portable (i.e. human-portable) are often referred to as drones. Such UAVs can be assembled from commercially off-the-shelf materials, or purchased in a ready-to-use state. A typical UAV can carry a relatively significant payload. Electric motors may provide UAVs with relative acoustic stealth. Commercially available miniature flight control computers and sensors provide such UAVs with some degree of autonomy, mitigating the need for line of sight operation or even a continuous link to a human pilot or offboard controller.

It is anticipated that inexpensive UAVs may be used by adversaries not only for intelligence, surveillance, and reconnaissance (ISR), but also as weapon delivery platforms that may carry explosive, chemical, radiological, and/or biological payloads. Attempting to destroy UAVs carrying such payloads makes possible inadvertent abetting of an adversary's mission. That is, conventional attempts to destroy a UAV may not neutralize the payload, but may actually assist in dispersing chemical or biological agents over an area. For example, shooting down a UAV could trigger dispersal of the chemical or biological agent onboard. Thus, systems that can capture and safely guide a UAV to earth at a desired location are generally desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate capture of unauthorized UAVs. According to at least one aspect, UAV capture devices are provided. According to one or more embodiments, a UAV capture device may include a netting system a propulsion system, a camera system, and a processing system coupled to the netting system, the propulsion system, the positioning system, and the camera system. The Netting system may include a net launch device and a net. The propulsion system may include a plurality of propellers coupled to one or more motors. The processing system may be adapted to operate the propulsion system to autonomously navigate to a general location of a target UAV in response to information obtained from the positioning system and from the camera system. The processing system may further be adapted to operate the propulsion system to pursue the target UAV in response to information obtained from the camera system, and deploy the netting system to propel the net at the target UAV.

According to one or more further embodiments, a UAV capture device may include a netting system, a propulsion system, a communications interface, and a processing system coupled to the netting system, the propulsion system, and the communications interface. The netting system may include a net launch device and a net. The propulsion system may include a plurality of propellers coupled to one or more motors. The processing system may be adapted to receive via the communications interface information from an external sensor system, and to operate the propulsion system to autonomously navigate to a general location of a target UAV in response to the information received from the external sensor system. The processing system may further be adapted to pursue the target UAV utilizing the propulsion system and information received from the external sensor system, and to initiate the net launch device to propel a net at the target UAV.

Additional aspects of the present disclosure include methods of operation of UAV capture devices. According to at least one implementation, such methods may include controlling a propulsion system to autonomously navigate to a general location of a target UAV in response to obtained information relating to a location of the UAV capture device and a location of the target UAV. A direction of travel may be determined for the target UAV, and the target UAV may be pursued utilizing the determined direction of travel for the target UAV to control the propulsion system. The target UAV may further be captured with a netting system.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular UAV capture device or specific components of a UAV capture device, but are merely idealized representations which are employed to describe the present disclosure. Additionally, elements common between figures may retain the same numerical designation.

Figure 1:
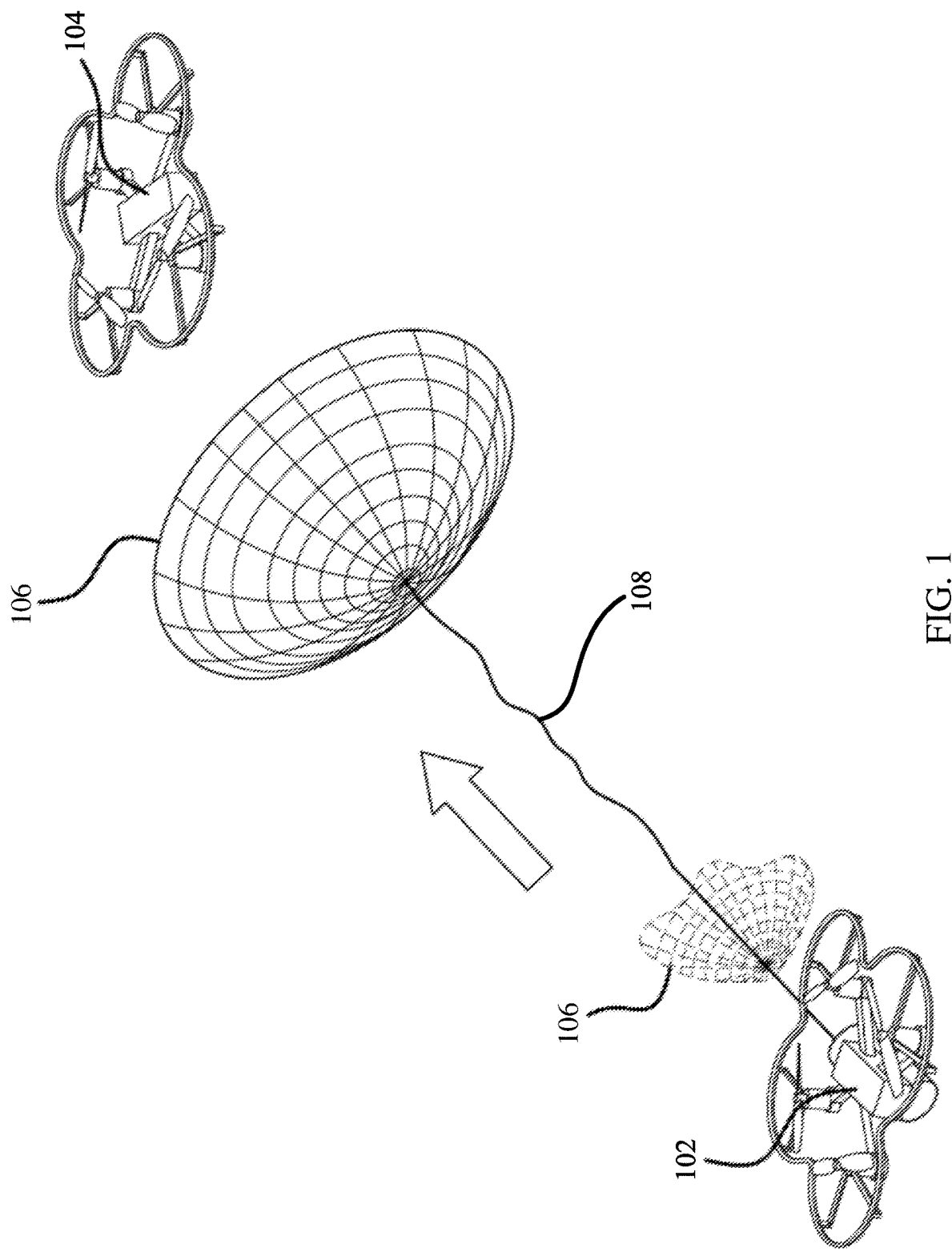
FIG. 1 is a diagram of a UAV capture device in an environment in which one or more aspects of the present disclosure may find application.
Figure 2:
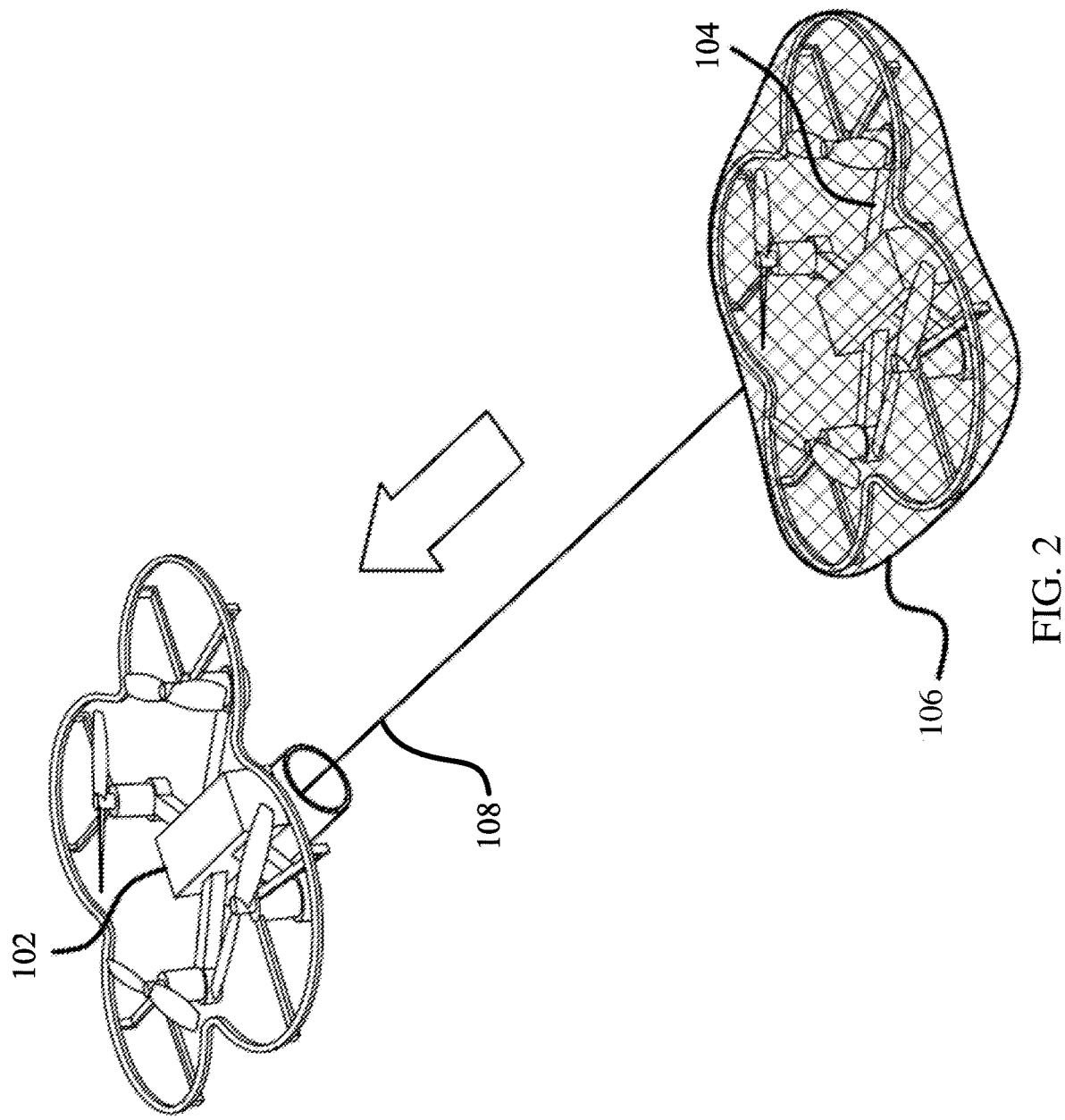
FIG. 2 is another diagram of a UAV capture device in an environment in which one or more aspects of the present disclosure may find application.

Various embodiments of the present disclosure include UAV capture devices capable of tracking, capturing, and guiding to earth at a desired location an unmanned aerial vehicle (UAV). Referring to FIG. 1 and FIG. 2, an example of a UAV capture device 102 is depicted in at least one example of an operational environment. The UAV capture device 102 is generally configured to fly while tracking down and capturing a target UAV 104. As depicted, the UAV capture device 102 may be configured as a multi-rotor aerial vehicle (e.g., a multicopter). In other embodiments, the UAV capture device 102 may be configured as a fixed wing aircraft, a rocket, or other aircraft/airborne vehicle The UAV capture device 102 is configured to capture a UAV 104 by deploying a net 106 toward the UAV 104. As shown, a net 106 can be deployed by the UAV capture device 102 to propel the net 106 toward the UAV 104. FIG. 1 illustrates how the net 106 may begin in a small compact shape and be opened wide as it is propelled toward the UAV 104, and FIG. 2 illustrates the UAV 104 captured in the net 106. As depicted in FIGS. 1 and 2, the net 106 may be tethered to the UAV capture device 102 by a cord 108 after it is deployed to enable the UAV capture device 102 to maintain a connection to the net 106 and to control where the UAV 104 goes after it is captured in the net 106. FIG. 2 illustrates the UAV capture device 102 towing the captured UAV 104 utilizing the cord 108.

Figure 3:
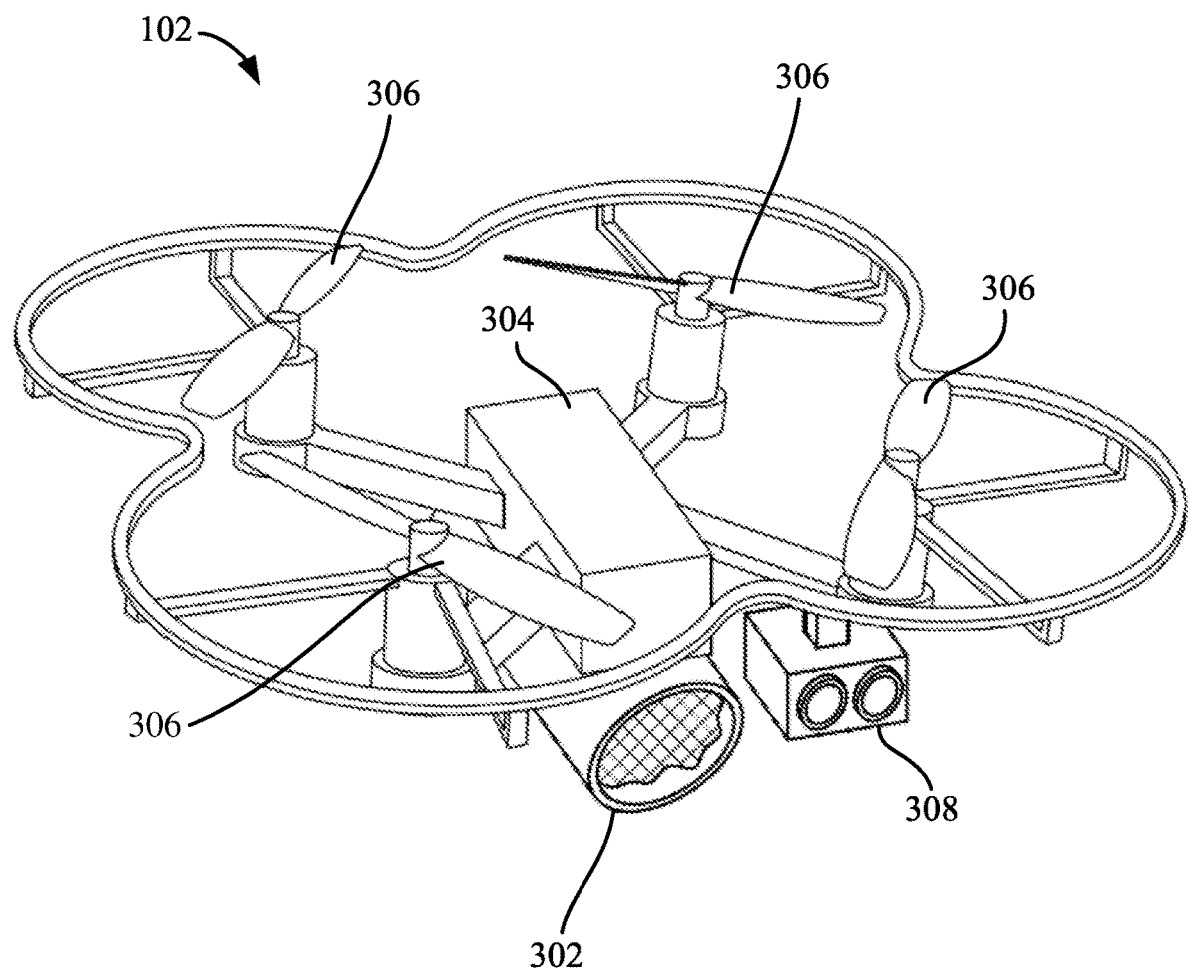
FIG. 3 is a diagram of a UAV capture device depicting some examples of select components according to at least one embodiment.

Referring now to FIG. 3 a diagram of a UAV capture device 102 is shown, depicting some examples of select components according to at least one embodiment. According to at least one aspect of the disclosure, the UAV capture device 102 can include various components that may be utilized to physically capture a target UAV (e.g., UAV 104 in FIG. 1), navigate the UAV capture device 102, and/or track a target UAV. For example, the UAV capture device 102 depicted in FIG. 3 is shown with a netting system 302. The netting system 302 may be generally configured to propel a net (e.g., net 106 in FIG. 1) toward a target UAV (e.g., UAV 104 in FIG. 1) for physically capturing the target UAV within the net. The netting system 302 may include one or more canisters with a propellant (e.g., compressed gas, gas generant, spring, electromagnet, etc.) and a net (e.g., net 106 in FIG. 1) stored therein. When the propellant is initiated, the net is propelled outward from the net canister toward a target. The net may include a perimeter or components near or beyond the perimeter that is/are heavier than a remainder of the net. When the netting system 302 is deployed and the net is propelled outward, the net perimeter may expand outward. According to a further aspect of the disclosure, the net can be tethered to an airframe 304 of the UAV capture device 102 by a cord or other mechanism.

Also depicted in FIG. 3, the UAV capture device 102 includes a propulsion system, including one or more propellers 306 and motors to which the propellers 306 are coupled for driving the propellers 306. Such a propulsion system is configured to move the UAV capture device 102 in various 3-dimensional directions within the airspace.

The UAV capture device 102 may further include a camera system 308. The camera system 308 may include components configured to localize a target UAV in 3-dimensional space relative to the UAV capture device 102. The camera system 308 may include one or more cameras capable of capturing imagery in visible and/or infrared spectrums. In at least one embodiment, the camera system 308 may include two cameras in a stereoscopic pair. In some embodiments, the camera system 308 may include a camera together with a rangefinder (e.g., ultrasonic range finder, laser rangefinder), or a radar. In all of the various embodiments for a camera system 308, the cameras, camera plus additional sensor(s), or radar allows for a tracked target to be localized in azimuth, elevation, and range relative to the UAV capture device 102.

Additionally, the UAV capture device 102 may include one or more positioning systems, such as a GPS system, and other sensors to detect the location and movement of the UAV capture device 102.

Figure 4:
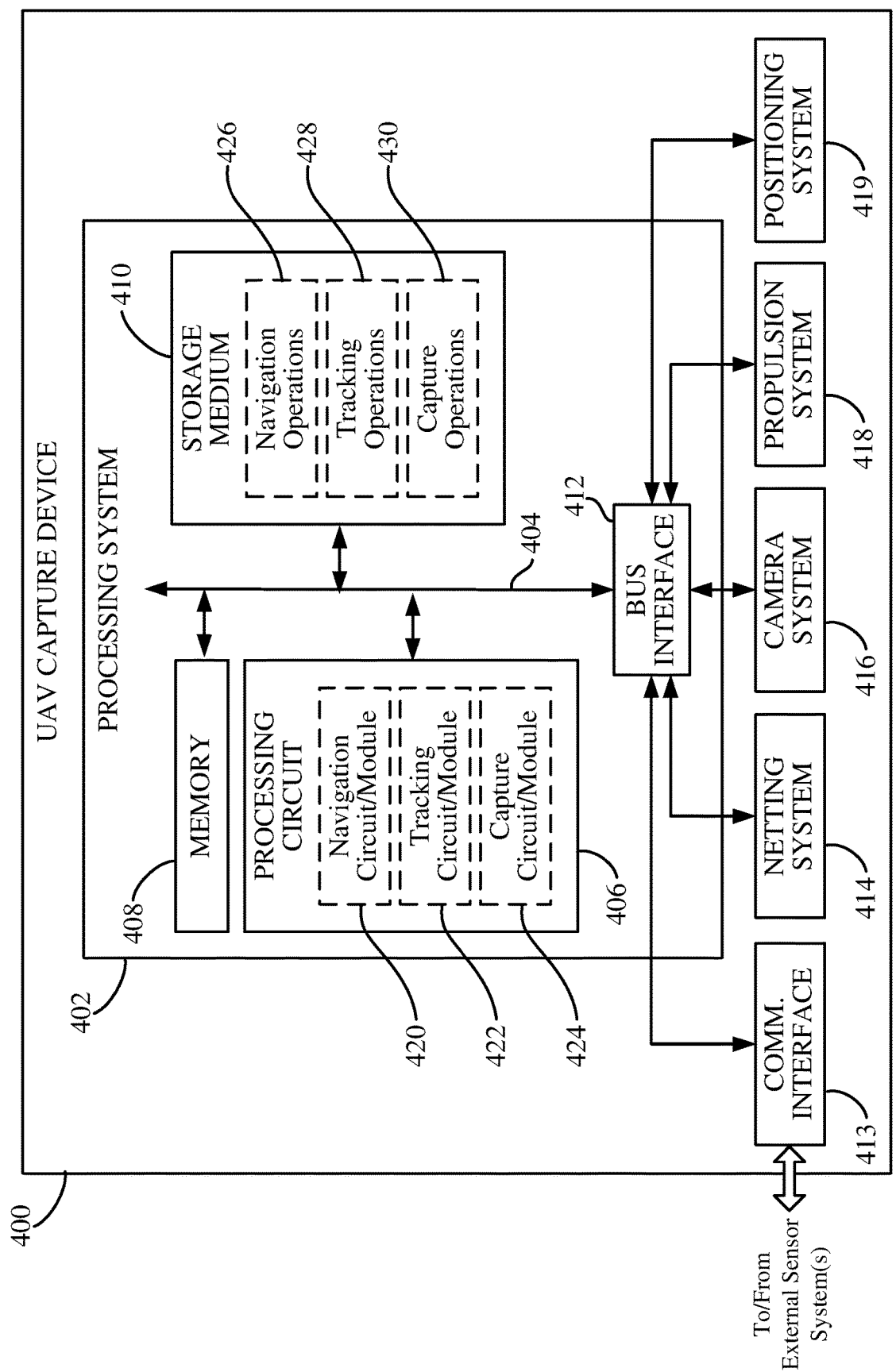
FIG. 4 is a block diagram illustrating select components of a UAV capture device employing a processing system according to at least one example of the present disclosure.

According to aspects of the present disclosure, the UAV capture device 102 is configured to perform navigation, tracking, and/or capture autonomously. Accordingly, the UAV capture device 102 further includes a processing system. FIG. 4 is a block diagram illustrating select components of a UAV capture device 400 employing a processing system 402 according to at least one example of the present disclosure. In this example, the processing system 402 is implemented with a bus architecture, represented generally by the bus 404. The bus 404 may include any number of interconnecting buses and bridges depending on the specific application of the processing system 402 and the overall design constraints. The bus 404 communicatively couples together various circuits including one or more processors (represented generally by the processing circuit 406), a memory 408, and computer-readable media (represented generally by the storage medium 410). The bus 404 may also link various other circuits such as timing sources, peripherals, voltage regulators, and power management circuits, which are well known in the art, and therefore, will not be described any further. A bus interface 412 provides an interface between the bus 404 and one or more components, including a communications interface 413, a netting system 414, a camera system 416, a propulsion system 418, and/or one or more positioning systems 419. The communications interface 413 is configured to facilitate wireless and/or wired communications of the UAV capture device 400. For example, the communications interface 413 may include circuitry and/or programming adapted to facilitate the wired and/or wireless communication of information bi-directionally with various other apparatus over a transmission medium. In at least one embodiment, a user interface (e.g., keypad, display, touchscreen, etc.) may also be provided.

The processing circuit 406 is responsible for managing the bus 404 and general processing, including the execution of programming stored on the computer-readable storage medium 410. The programming, when executed by the processing circuit 406, causes the processing system 402 to perform the various functions described below for any particular apparatus. The computer-readable storage medium 410 and the memory 408 may also be used for storing data that is manipulated by the processing circuit 406 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 406 is arranged to obtain, process and/or send data, control data access and storage, issue commands, and control other desired operations. The processing circuit 406 may include circuitry adapted to implement desired programming provided by appropriate media, and/or circuitry adapted to perform one or more functions described in this disclosure. For example, the processing circuit 406 may be implemented as one or more processors, one or more controllers, and/or other structure configured to execute executable programming and/or execute specific functions. Examples of the processing circuit 406 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 406 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 406 are for illustration and other suitable configurations within the scope of the present disclosure are also contemplated.

In some instances, the processing circuit 406 may include a navigation circuit and/or module 420, a tracking circuit and/or module 422, and a capture circuit and/or module 424. The navigation circuit/module 420 may generally include circuitry and/or programming (e.g., programming stored on the storage medium 410) adapted to control and/or make decisions based on information from one or more navigation components (e.g., camera system 416, the propulsion system 418, the positioning system(s) 419, external sensor system) to navigate the UAV capture device 400 while airborne. The tracking circuit/module 422 may generally include circuitry and/or programming (e.g., programming stored on the storage medium 410) adapted to control and/or make decisions based on information from one or more tracking components (e.g., camera system 416, the propulsion system 418, the external sensor system) to track a target UAV. The capture circuit/module 424 may generally include circuitry and/or programming (e.g., programming stored on the storage medium 410) adapted to fire one or more nets to capture a target UAV, as well as to determine whether a UAV has been captured in the net and to disconnect the net from the UAV capture device 400 on demand. As used herein, reference to circuitry and/or programming may be generally referred to as logic (e.g., logic gates and/or data structure logic).

The storage medium 410 may represent one or more computer-readable devices for storing programming, such as processor executable code or instructions (e.g., software, firmware), electronic data, databases, or other digital information. The storage medium 410 may also be used for storing data that is manipulated by the processing circuit 406 when executing programming. The storage medium 410 may be any available non-transitory media that can be accessed by a general purpose or special purpose processor, including portable or fixed storage devices, optical storage devices, and various other mediums capable of storing, containing and/or carrying programming By way of example and not limitation, the storage medium 410 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 410 may be coupled to the processing circuit 406 such that the processing circuit 406 can read information from, and write information to, the storage medium 410. That is, the storage medium 410 can be coupled to the processing circuit 406 so that the storage medium 410 is at least accessible by the processing circuit 406, including examples where the storage medium 410 is integral to the processing circuit 406 and/or examples where the storage medium 410 is separate from the processing circuit 406 (e.g., resident in the processing system 402, external to the processing system 402, distributed across multiple entities).

Programming stored by the storage medium 410, when executed by the processing circuit 406, can cause the processing circuit 406 to perform one or more of the various functions and/or process steps described herein. In at least some examples, the storage medium 410 may include navigation operations 426, tracking operations 428, and/or capture operations 430. The navigation operations 426 are generally adapted to cause the processing circuit 406 to control and/or make decisions based on information from one or more navigation components (e.g., camera system 416, the propulsion system 418, the positioning system(s) 419, the external sensor system) for navigating the UAV capture device 400 during flight, as described herein. The tracking operations 428 are generally adapted to cause the processing circuit 406 to control and/or make decisions based on information gathered from one or more tracking components (e.g., camera system 416, the propulsion system 418, external sensor system) to track a target (e.g., a target UAV through airspace), as described herein. The capture operations 430 are generally adapted to cause the processing circuit 406 to launch a net toward a target UAV, to determine whether a UAV has been captured in the net, and to disconnect the net from the UAV capture device 400 on demand, as described herein.

Thus, according to one or more aspects of the present disclosure, the processing circuit 406 is adapted to perform (independently or in conjunction with the storage medium 410) any or all of the processes, functions, steps and/or routines for any or all of the UAV capture devices described herein (e.g., UAV capture device 102, UAV capture device 400). As used herein, the term "adapted" in relation to the processing circuit 406 may refer to the processing circuit 406 being one or more of configured, employed, implemented, and/or programmed (in conjunction with the storage medium 410) to perform a particular process, function, step and/or routine according to various features described herein.

Figure 5:
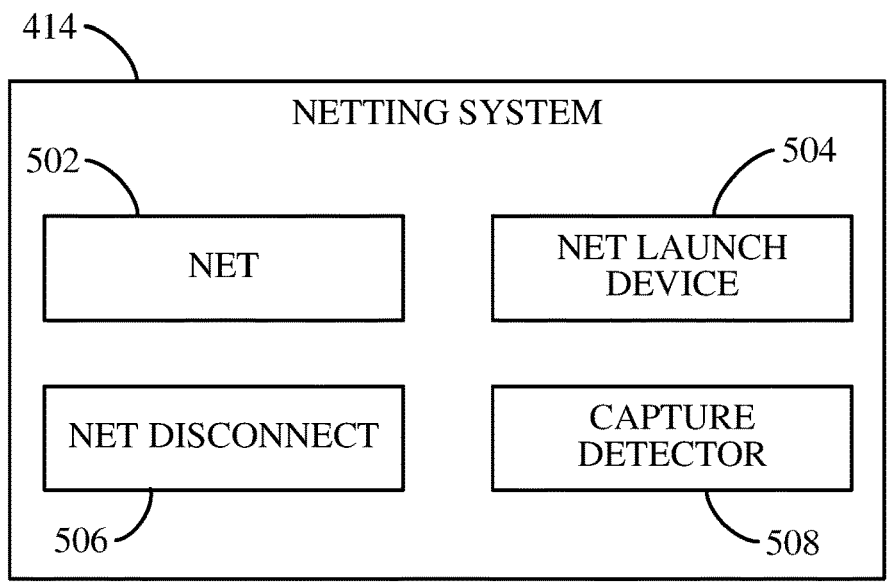
FIG. 5 is a block diagram illustrating select components that may be included in a netting system according to at least one example of the present disclosure.

As represented in FIG. 4, the UAV capture device 400 includes a netting system 414. FIG. 5 is a block diagram schematically illustrating select components that may be included in a netting system 414, although it should be apparent that a netting system 414 of the present disclosure may include additional, different, and/or fewer components than those depicted. In the example shown, the netting system 414 may include components configured to project a net from an airframe of the UAV capture device 400 toward a target UAV. Such a netting system 414 can include a net 502 and a net launching device 504 to launch the net 502 outward when a propellant (e.g., compressed gas, gas generant, spring, electromagnet) is initiated. The net 502 can be tethered to the airframe of the UAV capture device 400, as depicted in FIGS. 1 and 2.

Additionally, the netting system 414 may include a net disconnect 506 that is configured to disconnect the tethered net 502 on demand. In at least one embodiment, the net disconnect 506 may include a wire wrapped around a portion of the tether. The wire can be connected to an electrical source. In response to a determination by the processing system 402, an electrical current can be applied to the wire, causing the wire to heat to a relatively high temperature. The high temperature of the wire causes the wire to cut through or melt the tether, releasing the net and any UAV captured within the net from the UAV capture device 400.

The netting system 414 may further include a capture detector 508 to determine if the launched net 502 has successfully captured anything inside of it. For example, such a system may include a load cell connected with the tether to measure the tension on the tether and determine the weight of the hanging net, a camera to determine if the net is enlarged due to an object being contained inside, etc.

As further represented in the block diagram in FIG. 4, the UAV capture device 400 may also include a camera system 416. The camera system 416 may include one or more cameras capable of capturing imagery in visible and/or infrared spectrums. In at least one embodiment, the camera system 416 may include two cameras in a stereoscopic pair. In some embodiments, the camera system 416 may include a camera and a rangefinder, such as an ultrasonic range finder, a laser rangefinder, or radar. In at least one embodiment, the camera system 416 may be a camera system offered by INTEL and sold under the brand name REALSENSE.

The UAV capture device 400 can also include a propulsion system 418. The propulsion system 418 may include a plurality of propellers coupled to motors in a multicopter configuration. Such propellers and coupled motors are configured to move the UAV capture device 400 in various 3-dimensional directions within the airspace.

Additionally, the UAV capture device 400 may include a positioning system 419 configured to determine a current position, flight direction, and/or a target location of the UAV capture device 400. By way of example, a positioning system 419 may include one or more GPS receivers or other positioning components, gyroscopes, cameras, and/or other sensors for determining position information for the UAV capture device 400 in flight.

Figure 6:
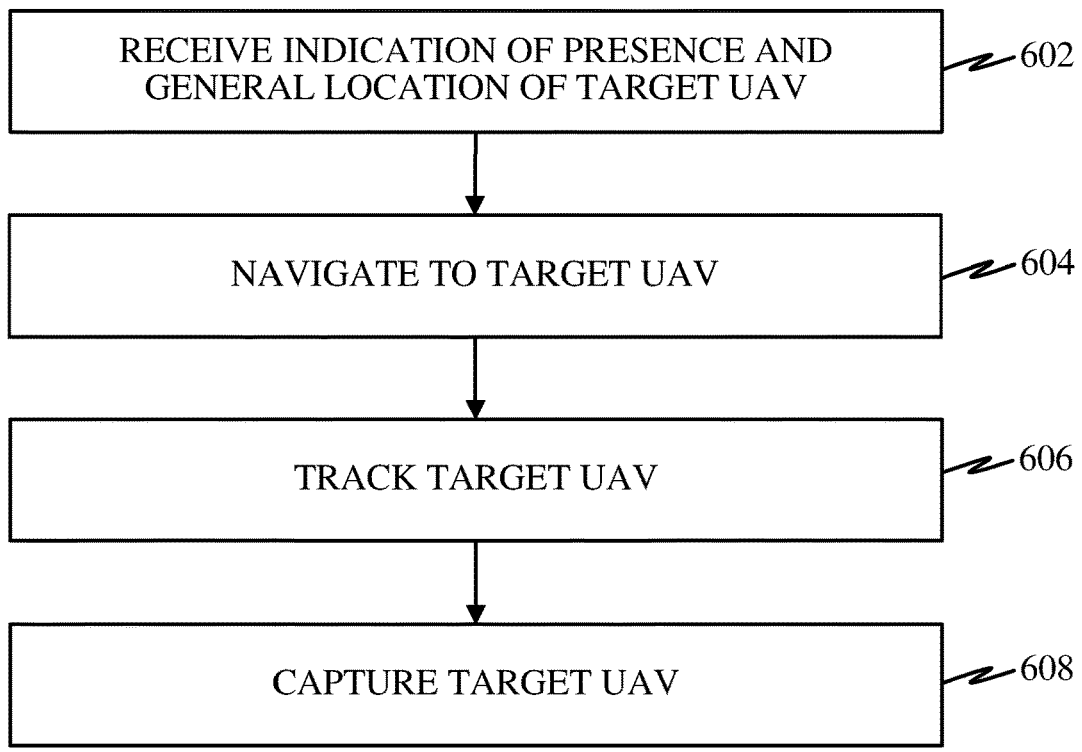
FIG. 6 is a flow diagram illustrating at least one example of a method operational for a UAV capture device.

In operation, a UAV capture device 400 can autonomously deploy and capture a target UAV (e.g., UAV 104 in FIG. 1), and subsequently dispose of the target UAV. FIG. 6 is a flow diagram illustrating at least one example of a method operational for a UAV capture device 400. With reference to FIGS. 4, 5, and 6, the UAV capture device 400 may receive an indication of the presence of an unauthorized target UAV at 602. In at least one implementation, the UAV capture device 400 may initially receive an input through an interface, where the input designates the presence and approximate location of the target UAV. In some embodiments, the interface may be a human interface, such as where a user can select a location on a map of a detected target UAV. In some embodiments, the interface may be the communications interface 413 where an external sensor system, such as a radar system, an electro-optical imaging system, etc. can electronically communicate an indication of the presence of the target UAV and its location. A non-limiting example of an external sensor system includes systems sold by Liteye Systems and SpotterRF, which may be employed to communicate with the UAV capture device 400 via the communications interface 413 to notify the UAV capture device 400 of the presence of an unauthorized target UAV and its general location.

On receipt of a notification indicating the presence and approximate location of the unauthorized target UAV, the UAV capture device 400 can navigate to the target UAV at step 604. For example, the UAV capture device 400 may control the propulsion system 418 to autonomously navigate to the approximate location of the target UAV in response to information obtained from the positioning system 419, from the camera system 416, and/or from the external sensor system. In some implementations, the UAV capture device 400 may determine a current location of the UAV capture device 400 from information obtained from the positioning system 419 and/or the external sensor system, and may determine a path from the current location to the approximate location of the target UAV.

In at least one implementation, the processing system 402 may include logic (e.g., navigation circuit/module 420 and/or navigation operations 426) to autonomously navigate to the general location of the target UAV utilizing information obtained from the positioning system 419 and the camera system 416. By way of example, on takeoff, the processing system 402 may utilize logic (e.g., navigation circuit/module 420 and/or navigation operations 426) to operate the propulsion system 418 to fly toward and find the target UAV. For example, the processing system 402 may include logic (e.g., navigation circuit/module 420 and/or navigation operations 426) to operate the propulsion system 418 (e.g., motors coupled to the propellers) to navigate the UAV capture device 400 along the determined path to the target UAV in response to information obtained from the positioning system 419 (e.g., GPS, sensors), as well as information obtained from the camera system 416 to identify and avoid obstacles.

In some implementations, the processing system 402 may include logic (e.g., navigation circuit/module 420 and/or navigation operations 426) to autonomously navigate to the general location of the target UAV utilizing information obtained via the communications interface 413 from one or more external sensor system(s). Such an external sensor system may include components such as radar systems, electro-optical imaging systems, etc. that are ground-based and/or located on one or more other UAVs. The external sensor system can collect information and provide the information to the UAV capture device 400 by communications received at the UAV capture device 400 via the communications interface 413. By way of example, on takeoff, the processing system 402 may receive a communication via the communication interface from an external sensor system. The processing system 402 may utilize logic (e.g., navigation circuit/module 420 and/or navigation operations 426) to operate the propulsion system 418 to navigate the UAV capture device 400 to the target UAV in response to the received information to identify a location of the target UAV, a direction of travel of the target UAV, and/or avoid obstacles.

At 606, the UAV capture device 400 can track the target UAV. For example, in at least one implementation the UAV capture device 400 may identify the target UAV by viewing the target UAV with the camera system 416 and determining a size and shape of the target UAV by analyzing the images of the target UAV captured by the camera system 416. Based on the size and shape of the target UAV matching a size and shape previously determined to correspond to a target UAV, the UAV capture device 400 can identify the target UAV as the target. For instance, the processing system 402 may include logic (e.g., tracking circuit/module 422 and/or tracking operations 428) to utilize imagery from a camera system to identify the target UAV. In at least one embodiment, a camera system may include a thermal camera that is configured to provide information to the processing system 402 to identify heat signatures that are unique to man-made devices compared to natural objects like a bird. In embodiments where the camera system includes a camera and a range finder or a stereoscopic pair of cameras, the camera system can provide information to the processing system 402 to enable the processing system 402 (e.g., tracking circuit/module 422 and/or tracking operations 428) to determine a size and shape of a detected object. Such information about the size and shape of the detected object can be utilized by logic of the processing system 402 (e.g., tracking circuit/module 422 and/or tracking operations 428) to determine if the detected object is a bird or a UAV, as well as to determine whether the UAV is a size that the UAV capture device 400 is capable of capturing with the netting system 414.

In some implementations, the UAV capture device 400 may utilize information received via the communications interface 413 from the external sensors to obtain high-resolution information of both the UAV capture device 400 and the target UAV. In such embodiments, the UAV capture device 400 can minimize dependence on any camera system 416 and the positioning system 419 to determine the location of the target UAV and the path to the target UAV.

With the target UAV identified, the UAV capture device 400 can determine a direction and speed of travel for the target UAV. In embodiments relying on the camera system 416, the UAV capture device 400 can determine the direction of travel for the target UAV from information obtained by the camera system 416, and may pursue the target UAV utilizing the determined direction and speed of travel for the target UAV to control the propulsion system 418 and maneuver the UAV capture device 400 toward a projected path of the target UAV. For example, the processing system 402 may include logic (e.g., tracking circuit/module 422 and/or tracking operations 428) to process images and information from the camera system 416 to determine a bearing of the target UAV. In response to the determined bearing of the target UAV, the processing system 402 may include logic (e.g., tracking circuit/module 422 and/or tracking operations 428) to control the propulsion system 418 to maneuver toward a projected path of the target UAV and position the UAV capture device 400 in a location relative to the target UAV to successfully capture the target UAV. That is, the processing system 402 can employ logic (e.g., navigation circuit/module 420 and/or navigation operations 426) to navigate the UAV capture device 400 into a position where the UAV capture device 400 is most likely to be successful in capturing the target UAV with the netting system 414, based on the information obtained by tracking the target UAV in 3-dimensional space.

In embodiments utilizing communications from an external sensor system, the UAV capture device 400 can determine the direction of travel for the target UAV utilizing the information received via the communications interface. As noted above, the UAV capture device 400 may receive high-resolution information of both the UAV capture device 400 and the target UAV from an external sensor system. The processing system 402 may include logic (e.g., tracking circuit/module 422 and/or tracking operations 428) to process the information received via the communications interface 413 from one or more external sensor systems to determine a bearing of the target UAV relative to the location of the UAV capture device 400. In response to the determined bearing of the target UAV relative to the location of the UAV capture device 400, the processing system 402 may include logic (e.g., tracking circuit/module 422 and/or tracking operations 428) to control the propulsion system 418 to maneuver toward a projected path of the target UAV and position the UAV capture device 400 in a location relative to the target UAV to successfully capture the target UAV. That is, the processing system 402 can employ logic (e.g., navigation circuit/module 420 and/or navigation operations 426) to navigate the UAV capture device 400 into a position where the UAV capture device 400 is most likely to be successful in capturing the target UAV with the netting system 414, based on the information obtained by tracking the target UAV in 3-dimensional space.

When the UAV capture device 400 has successfully tracked the target UAV and navigated into an appropriate position relative to the target UAV, the UAV capture device 400 can capture the target UAV with the netting system 414 at step 608. For example, the processing system 402 may include logic (e.g., capture circuit/module 424 and/or capture operations 430) to deploy the netting system 414, thereby initiating the net launch device 504 to propel the net 502 at the target UAV.

Figure 7:
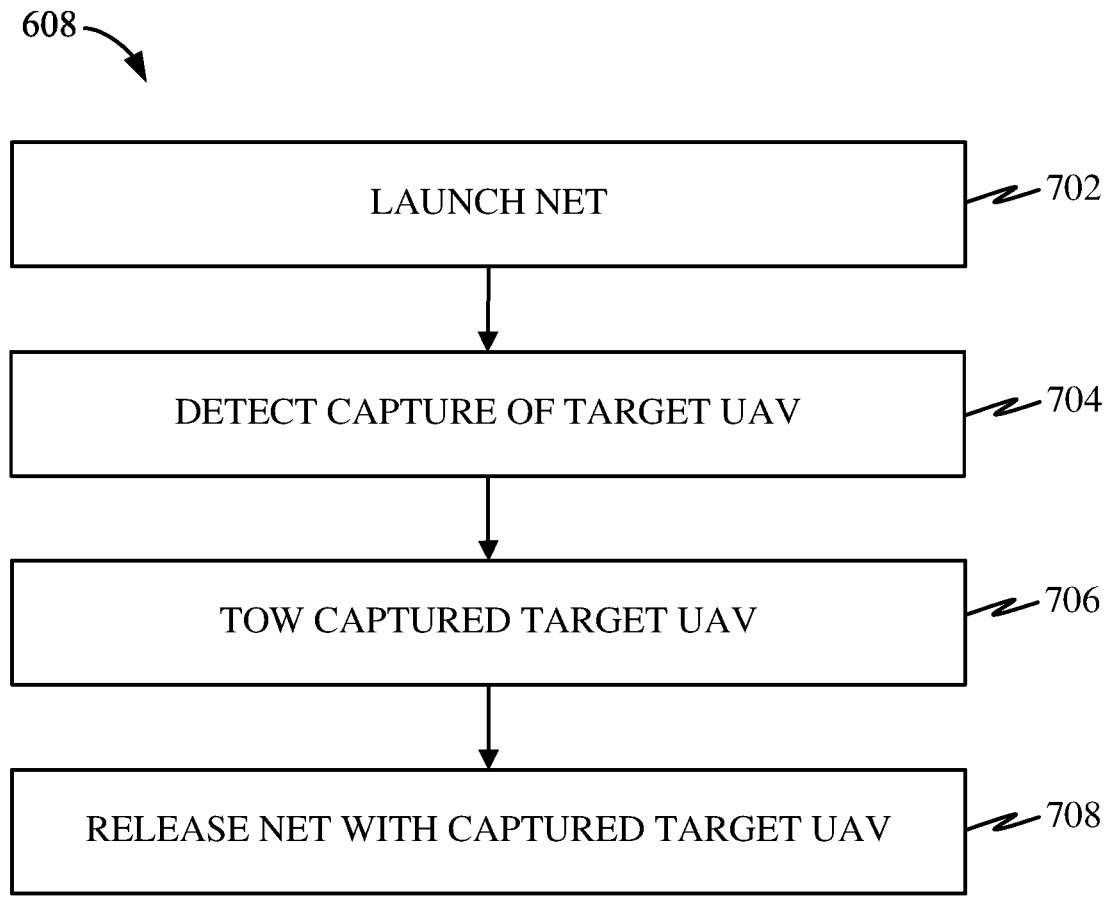
FIG. 7 is a flow diagram illustrating one or more possible operations that may be implemented under capturing a target UAV in FIG. 6.

FIG. 7 illustrates various steps, one or more of which may be involved in capturing a target UAV under operation 608 in FIG. 6. In at least one example, the processing system 402 includes logic (e.g., capture circuit/module 424 and/or capture operations 430) to initiate a propellant associated with the net launch device 504 to launch or propel a net 502 from the UAV capture device 400 toward the target UAV at 702.

The processing system 402 may further include logic (e.g., capture circuit/module 424 and/or capture operations 430) to detect whether the target UAV has been successfully captured in the net 502 utilizing information from the capture detector 508 at 704. For example, the processing system 402 may include logic (e.g., capture circuit/module 424 and/or capture operations 430) to obtain information from the camera system to determine whether the net 502 has enlarged since being deployed. In another example, the processing system 402 may include logic (e.g., capture circuit/module 424 and/or capture operations 430) to determine whether a weight of the netting system has increased after being deployed based on information obtained from a load cell.

The processing system 402 may further include logic (e.g., navigation circuit/module 420 and/or navigation operations 426) to tow a captured target UAV to a predetermined or designated location at 706. In at least one embodiment, the processing system 402 may include logic (e.g., navigation circuit/module 420 and/or navigation operations 426) to operate the propulsion system 418 for towing the target UAV to a pre-determined or designated location utilizing information obtained from the positioning system 419, the camera system 416, and/or the external sensor system, as well as in response to a determination that the target UAV has been successfully captured in the net 502.

The processing system 402 may include logic (e.g., capture circuit/module 424 and/or capture operations 430) to release the net 502 from the UAV capture device on demand at 708. For example, the processing system 402 may include logic (e.g., capture circuit/module 424 and/or capture operations 430) to initiate an electrical current flow through a conductor wrapped around the cord tethering the net 502 to the UAV capture device 400, where the current causes the conductor to heat sufficiently hot to cut through the cord. Cutting through the cord disconnects the net and a captured target UAV from the UAV capture device 400. In some embodiments, the processing system 402 may include logic (e.g., capture circuit/module 424 and/or capture operations 430) to determine when to release the net based on a location of the UAV capture device 400. In this manner, the UAV capture device 400 can autonomously deposit the captured target UAV into a safe location.

It is noted that although the present examples describe capture of a target UAV, UAV capture devices of the present disclosure can also be employed in capturing other objects. By way of example and not limitation, UAV capture devices of the present disclosure may be configured to capture other airborne objects, such as birds in a non-lethal way, or to capture land-based objects, such as humans or animals.

While the above discussed aspects, arrangements, and embodiments are discussed with specific details and particularity, one or more of the components, steps, features and/or functions illustrated in FIGS. 1, 2, 3, 4, 5, 6, and/or 7 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 3, 4, and/or 5 may be configured to perform or employ one or more of the methods, features, parameters, and/or steps described in FIGS. 6 and 7. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An unmanned aerial vehicle (UAV) capture device, comprising:
 a netting system including a net launch device and a net;
 a propulsion system including a plurality of propellers coupled to one or more motors;
 a positioning system;
 a camera system; and
 a processing system coupled to the netting system, the propulsion system, the positioning system, and the camera system, the processing system comprising logic to:
  operate the propulsion system to autonomously navigate to a general location of a target UAV in response to information obtained from the positioning system and from the camera system;
  determine a size and shape of the target UAV utilizing information obtained from the camera system;
  identify the target UAV as a target to be captured based on the determined size and shape;
  determine a direction of travel of the target UAV and a speed of the target UAV from images and information obtained by the camera system;
  operate the propulsion system to pursue the target UAV in response to the determined direction of travel of the target UAV and a speed of the target UAV; and
  deploy the netting system to propel the net at the target UAV.

2. The UAV capture device of claim 1, wherein the netting system further includes:
 a tether coupled between the net and the UAV capture device;
 a net disconnect; and
 a capture detector.

3. The UAV capture device of claim 2, wherein the processing system further comprises logic to detect whether the netting system successfully captured the target UAV utilizing information obtained from the capture detector.

4. The UAV capture device of claim 3, wherein the capture detector comprises a load cell, and wherein the logic to detect whether the netting system successfully captured the target UAV comprises logic to determine whether the netting system successfully captured the target UAV utilizing information obtained from the load cell.

5. The UAV capture device of claim 2, wherein the processing system further comprises logic to initiate the net disconnect to untether the net from the UAV capture device.

* * * * *